(12) United States Patent
Zhu et al.

(10) Patent No.: US 10,100,969 B1
(45) Date of Patent: Oct. 16, 2018

(54) MOVABLE SUNSHADE BASE

(71) Applicant: LINHAI BAOCHENG CRAFTS CO., LTD, Linhai (CN)

(72) Inventors: Shilin Zhu, Linhai (CN); Defu Liu, Linhai (CN)

(*) Notice: Subject to any disclaimer, the term of this patent is extended or adjusted under 35 U.S.C. 154(b) by 0 days.

(21) Appl. No.: 15/706,673

(22) Filed: Sep. 16, 2017

(30) Foreign Application Priority Data

Sep. 5, 2017 (CN) .................... 2017 2 1130493 U

(51) Int. Cl.
| | |
|---|---|
| *E04H 12/22* | (2006.01) |
| *A45B 25/00* | (2006.01) |
| *F16M 11/20* | (2006.01) |
| *F16M 11/42* | (2006.01) |
| *B62B 5/04* | (2006.01) |
| *B62B 5/00* | (2006.01) |
| *E04H 15/28* | (2006.01) |
| *B60B 33/00* | (2006.01) |
| *A45B 23/00* | (2006.01) |

(52) U.S. Cl.
CPC ........... *F16M 11/42* (2013.01); *B62B 5/0089* (2013.01); *B62B 5/04* (2013.01); *B62B 5/049* (2013.01); *E04H 12/2238* (2013.01); *A45B 23/00* (2013.01); *A45B 2025/003* (2013.01); *B60B 33/00* (2013.01); *E04H 15/28* (2013.01); *F16M 2200/08* (2013.01)

(58) Field of Classification Search
CPC ..... B60B 33/06; B60B 33/006; B62B 5/0089; B62B 5/04; B62B 5/049
USPC ............................... 280/43.17, 43.14, 43.24
See application file for complete search history.

(56) References Cited

U.S. PATENT DOCUMENTS

| | | | | |
|---|---|---|---|---|
| 1,463,538 A | * | 7/1923 | Tangauy ............... | B62B 3/0625 254/10 C |
| 4,378,191 A | * | 3/1983 | Sato ....................... | B60P 1/027 254/2 C |
| 4,417,738 A | * | 11/1983 | Kendall ................. | B60B 33/06 16/34 |
| 4,902,026 A | * | 2/1990 | Maldonado .......... | B60N 2/2848 280/30 |
| 5,769,436 A | * | 6/1998 | Andrey ................... | B60B 33/06 280/47.17 |

(Continued)

FOREIGN PATENT DOCUMENTS

| | | | |
|---|---|---|---|
| CN | 201513683 U | * | 6/2010 |
| DE | 102014006890 A1 | * | 11/2015 |

*Primary Examiner* — Robert Canfield
(74) *Attorney, Agent, or Firm* — Wayne & Ken, LLC; Tony Hom

(57) ABSTRACT

The present disclosure relates to a movable sunshade base. The base comprises a base frame, a base cover, a roller component, a rotary assembly, a transmission component, a first drive rod, a second drive rod and a pull rod. Through swinging a pull rod, the second drive rod drives the transmission shaft, thereby driving the first drive rod. Driven by the first drive rod, a wheel bracket achieves power transmission using the leverage theorem, thereby controlling the roller to move to the outside of the base frame. When the movement is completed, the pull rod is swung to the opposite direction so that the roller can shrink into the base frame. The disclosure has the advantages of simple operation, convenient appearance, strong practicability and low cost, and can effectively solve the problem of moving difficulty and can be applied to various types of sunshade base.

9 Claims, 11 Drawing Sheets

(56) References Cited

U.S. PATENT DOCUMENTS

| | | | | |
|---|---|---|---|---|
| 6,656,065 | B2* | 12/2003 | Nye | A63B 63/083 |
| | | | | 254/9 R |
| 8,109,525 | B2* | 2/2012 | Salus | A61G 7/08 |
| | | | | 180/209 |
| 8,833,709 | B2* | 9/2014 | Weng | A45B 23/00 |
| | | | | 135/16 |
| 9,192,266 | B2* | 11/2015 | Starr | A47J 47/16 |
| 9,358,995 | B2* | 6/2016 | Allos | B62B 3/008 |
| 2005/0205727 | A1* | 9/2005 | Nerger | E04H 12/2238 |
| | | | | 248/128 |
| 2011/0232704 | A1* | 9/2011 | Li | A45B 25/14 |
| | | | | 135/16 |
| 2012/0024329 | A1* | 2/2012 | Ma | E04H 12/2238 |
| | | | | 135/16 |
| 2012/0024330 | A1* | 2/2012 | Ma | A45B 23/00 |
| | | | | 135/16 |
| 2012/0025050 | A1* | 2/2012 | Ma | E04H 12/2238 |
| | | | | 248/346.01 |
| 2017/0114563 | A1* | 4/2017 | Ye | E04H 12/2238 |

\* cited by examiner

B-B

MOVABLE SUNSHADE BASE

FIELD OF THE INVENTION

The present disclosure relates to the field of outdoor large-scale fixed sunshade technology, and more specifically, to a movable sunshade base.

BACKGROUND OF THE INVENTION

Sunshades are widely used in daily life. The supporting and fixing of sunshade depends mainly on the gravity of the base. The base is an important part for sunshade, especially for some large sunshades with large umbrella area, equipping with a heavy base having more than a hundred kilograms and are difficult to be moved. In order to solve the problem of difficulty in moving the sunshade base, the existing base sets four universal wheels at the bottom of the main body of the sunshade base and install the brake assembly on the universal wheels. Although this base is convenient to be removed, but the cost is higher, and users often forget to lock the brake assembly and cause the sunshade base to be unstable, especially when the umbrella is affected by the wind, the whole side sways laterally. In addition, the wheels directly contact with the ground, and footprint area is small, the stability of the base is poor, so sunshades are easy to overturn. This structure realizes movement basically, but the movement of this base only relies on pushing the sunshade to move, so that the direction is not easy to be controlled, the operation is more complex and costly, and this sunshade base is not easy to be promoted.

SUMMARY OF THE INVENTION

In view of the above, the disclosure aims at providing a simple and practical and low-cost movable sunshade base which is intended to solve the problem that the existing parasite base is difficult to move and the base is poor in stability.

The disclosure is realized by the following technical scheme: a movable sunshade base comprises a base frame, a base cover, a roller component, a rotary assembly, a transmission component, a first drive rod, a second drive rod and a pull rod. The base cover is provided above the base frame, the roller component and the rotary assembly are arranged below the base frame, the transmission component is arranged on the base frame; the roller component is connected with the transmission component by the first drive rod, the rotary assembly is connected with the transmission component by the second drive rod, the pull rod is provided at a top end of the rotary assembly.

Further, the roller component comprises at least two sets of roller brackets and a first roller, the roller bracket is hinged to the base frame by a bolt, the first roller arranged at one end of the roller bracket is connected with the roller bracket through a hing pin, and the other end of the roller bracket is hinged to one end of the first drive rod.

Further, the rotary assembly comprises a rotating seat, a guiding wheel frame, a second roller, a steel ball, a fixed bracket, a first shaft circlip and a positioning sleeve; the guiding wheel frame is connected with the rotating seat up and down by the steel ball, and the second roller is arranged on the other end of the guiding wheel frame, both ends of the rotating seat are mounted into holes of the fixed bracket, and the fixed bracket is connected on the base frame by a bolt.

Preferably, the guiding wheel frame is positioned on the rotating seat by the positioning sleeve, and a shaft of the guiding wheel frame is provided with a thread and is fixed to the rotating seat by a nut.

Preferably, the second roller is locked on the guiding wheel frame by a pinned outer screw and a pinned inner screw.

Further, a top end of the rotating seat is hinged to one end of the second drive rod, and a top end of the guiding wheel frame is connected with the pull rod.

Further, the transmission component comprises at least one set of transmission assembly consisting of a transmission shaft seat, a driver blade and a transmission shaft neck bush; the transmission shaft seat is locked on the base frame by bolted connection, the transmission shaft is arranged in the pre-set hole of the transmission shaft seat, the driver blade is provided between two circular holes of the transmission shaft seat through the transmission shaft neck bush, and the driver blade is mounted on the transmission shaft.

Further, the transmission shaft has a hexagonal cross section, and both ends of the transmission shaft are fastened to the transmission shaft seat by the second shaft circlip.

Further, the inner hole of the transmission shaft neck bush is hexagonal, and an inner hole of the driver blade is hexagonal, and the transmission shaft neck bush is connected with the transmission shaft seat in a manner of gap junction, the transmission shaft is connected with the transmission shaft neck bush and the inner hole of driver blade in a manner of interference fit.

Further, a top end of the driver blade is hinged to one end of the second drive rod or the first drive rod, respectively.

The disclosure provides a movable sunshade base, the advantageous effects of the disclosure are as follows:

the disclosure provides a movable sunshade base, through swinging the pull rod, the second drive rod drives the transmission shaft, thereby driving the first drive rod. Driven by the first drive rod, a wheel bracket achieves power transmission using the leverage theorem, thereby controlling the roller to move to outside of the base frame. When the movement is completed, the pull rod is swung to the opposite direction so that the roller can shrink into the base frame. The disclosure has the advantages of simple operation, convenient appearance, beautiful appearance, strong practicability and low cost, and can effectively solve the problem of moving the sunshade base in the real life, and is suitable for the promotion and can be applied to various types of sunshade base.

In the figures, 1—base frame, 2—roller component, 201—roller bracket, 202—bolt, 203—first roller, 3—rotary assembly, 301—rotating seat, 302—guiding wheel frame, 303—nut, 304—second roller, 305—steel ball, 306—pinned inner screw, 307—pinned outer screw, 308—fixed bracket, 309—first shaft circlip, 310—positioning sleeve, 4—first drive rod, 5—transmission component, 501—transmission shaft seat, 502—transmission shaft, 503—transmission shaft neck bush, 504—driver blade, 505—second shaft circlip, 6—second drive rod, 7—pull rod, 8—base cover.

DETAILED DESCRIPTION OF THE INVENTION

The preferred embodiments of the disclosure will be described in detail with reference to the drawings.

The present invention will be described in further detail with reference to the accompanying drawings, in order to make the objects, technical solutions and advantages clearer. It is to be understood that the specific embodiments described herein are merely illustrative of the disclosure and are not intended to limit the disclosure.

It needs to be explained that when a part is referred to as being "arranged" on another component, it may be arranged on another component directly or indirectly. When a component is called "connected" to another component, it can be connected to another component directly or indirectly.

It also needs to be explained that the nouns of locality such as left, right, up, down, top and bottom in the present embodiment are merely relative concepts or referred to the normal use state of the product and should not be considered to be restrictive.

Figure 1:
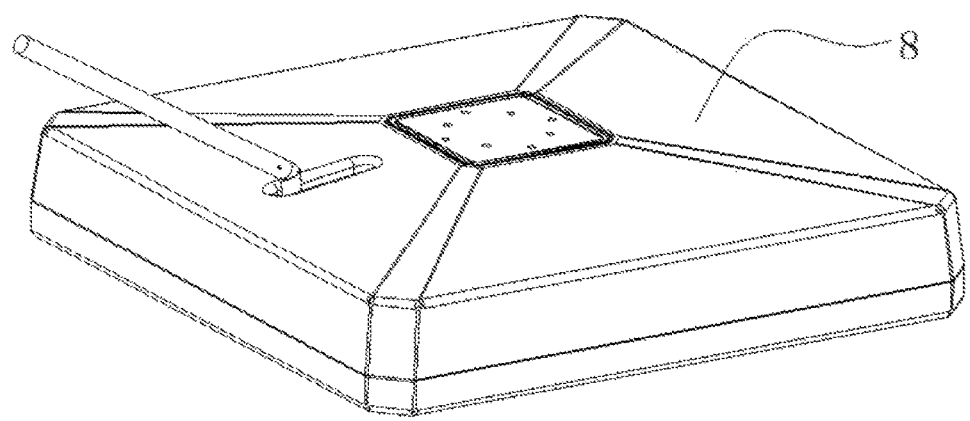
FIG. 1 is a schematic view of a movable sunshade base provided by the disclosure.
Figure 2:
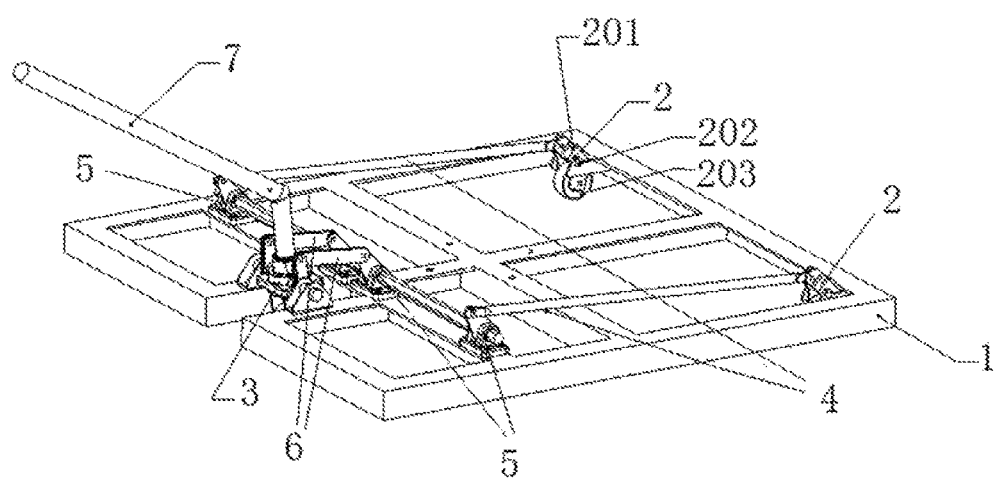
FIG. 2 is an axonometric view of a movable sunshade base provided by the disclosure.

As illustrated in FIG. 2, the disclosure provides a movable sunshade base which comprises a base frame 1, a base cover 8, a roller component 2, a rotary assembly 3, a transmission component 5, a first drive rod 4, a second drive rod 6 and a pull rod 7. The base cover 8 is provided above the base frame 1, the roller component 2 and the rotary assembly 3 are arranged below the base frame 1, the transmission component 5 is arranged on the base frame 1; and the roller component 2 is connected with the transmission component 5 by the first drive rod 4, the rotary assembly 3 is connected with the transmission component 5 by the second drive rod 6, the pull rod 7 is provided at a top end of the rotary assembly 3.

As illustrated in FIG. 2, the roller component 2 comprises at least two sets of roller brackets 201 and a first roller 203, the roller bracket 201 is hinged to the base frame 1 by a bolt, the first roller 203 arranged at one end of the roller bracket 201 is connected with the roller bracket 201 through a hing pin, and the other end of the roller bracket 201 is hinged to one end of the first drive rod 4. The other end of the first drive rod 4 is hinged to the driver blade 504, and the driver blade 504 is hinged to the second drive rod 6, and finally hinged to the rotating seat.

Figure 6:
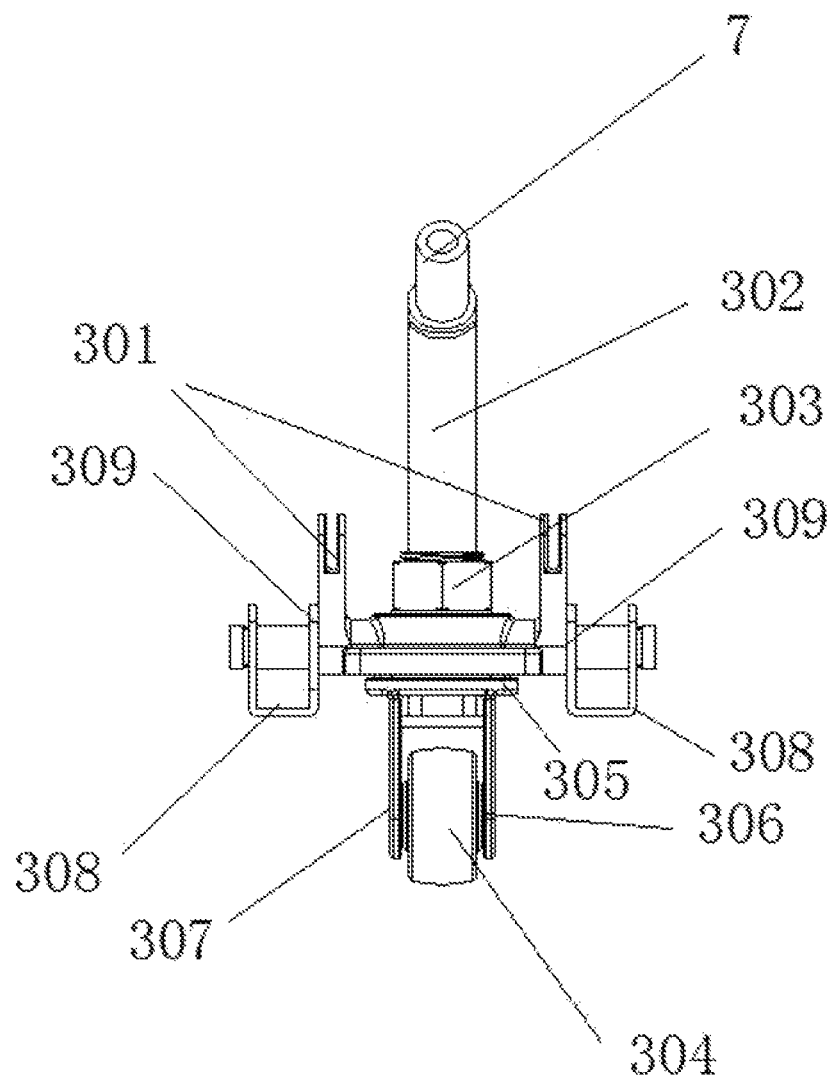
FIG. 6 is a schematic illustration of a rotary assembly of a movable sunshade base provided by the disclosure.
Figure 7:
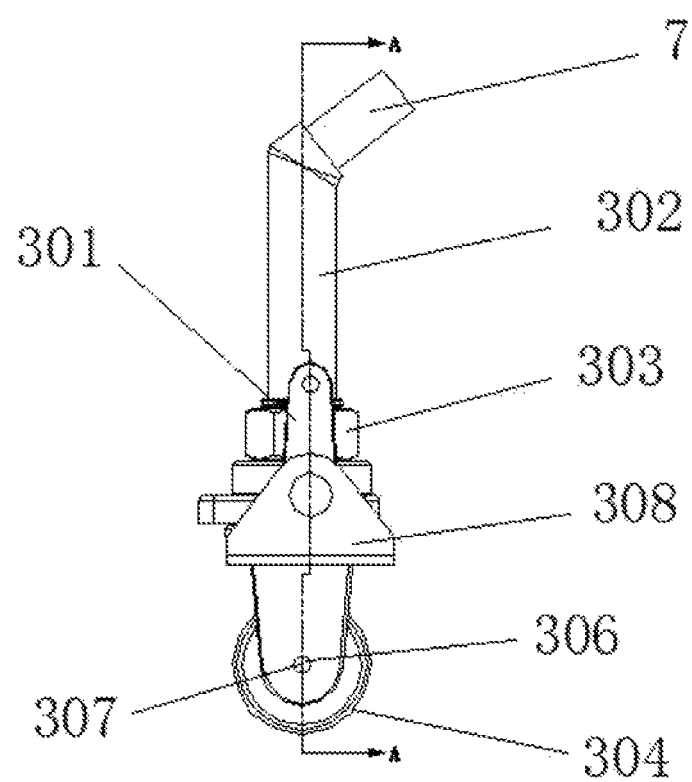
FIG. 7 is a side view of a rotary assembly of a movable sunshade base provided by the disclosure.
Figure 8:
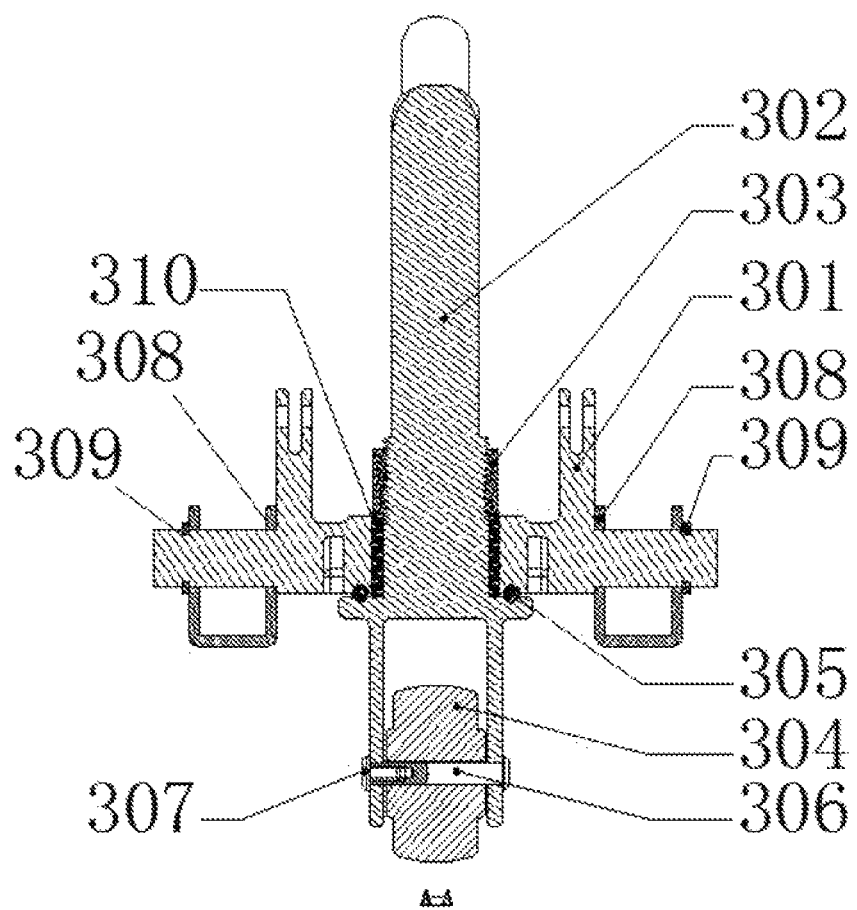
FIG. 8 is a cross-sectional view of A-A of a rotary assembly of a movable sunshade base provided by the disclosure.

As illustrated in FIGS. 6-8, the rotary assembly 3 described in the above embodiment comprises a rotating seat 301, a guiding wheel frame 302, a second roller 304, a steel ball 305, a fixed bracket 308 and a positioning sleeve 310. The steel ball 305, the rotating seat 301 and the positioning sleeve 310 are sequentially attached to one end of the guiding wheel frame 302, a thread is provided on the shaft of the guiding wheel frame 302, and the nut 303 is locked with the thread, the other end of the guiding wheel frame 302 is connected with the second roller 304, and the second roller 304 is locked on the guiding wheel frame 302 by the pinned outer screw and the pinned inner screw. Both ends of the rotating seat 301 are mounted into holes of the fixed bracket 308, the fixed bracket 308 is connected on the base frame 1 by a bolt. A top end of the rotating seat 301 is hinged to the second drive rod 6, and a top end of the guiding wheel frame 302 is connected with the pull rod 7. The action of the pull rod 7 is to move the sunshade base easily and control the direction of movement of the base accurately.

Figure 9:
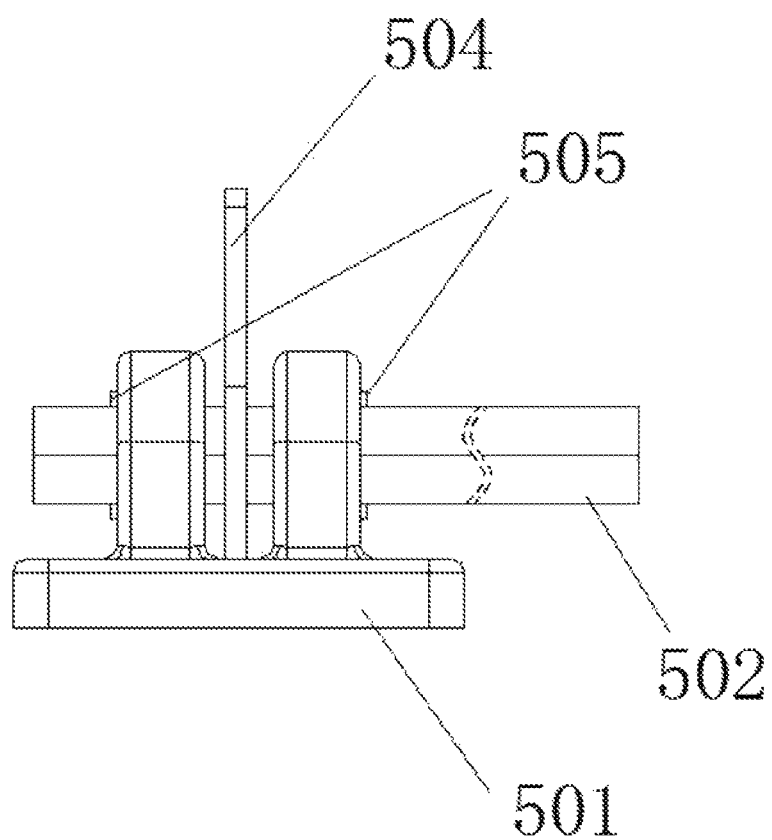
FIG. 9 is a schematic view of a transmission assembly of a movable sunshade base provided by the disclosure.
Figure 10:
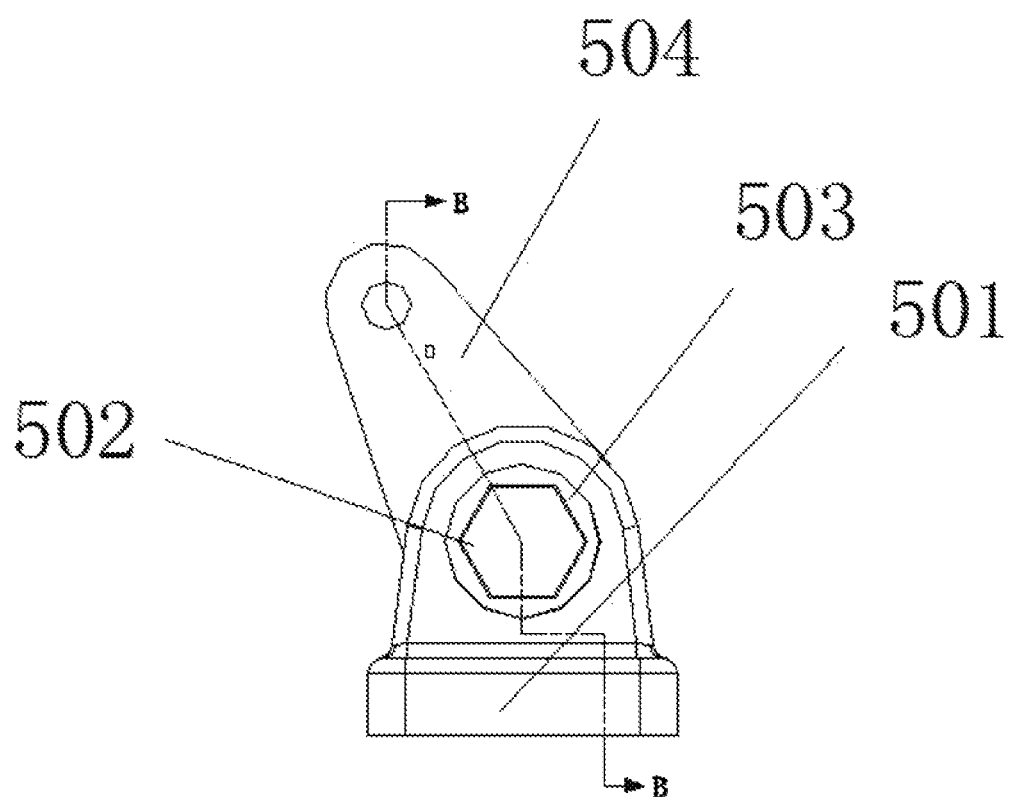
FIG. 10 is a side view of a transmission assembly of a movable sunshade base provided by the disclosure.
Figure 11:
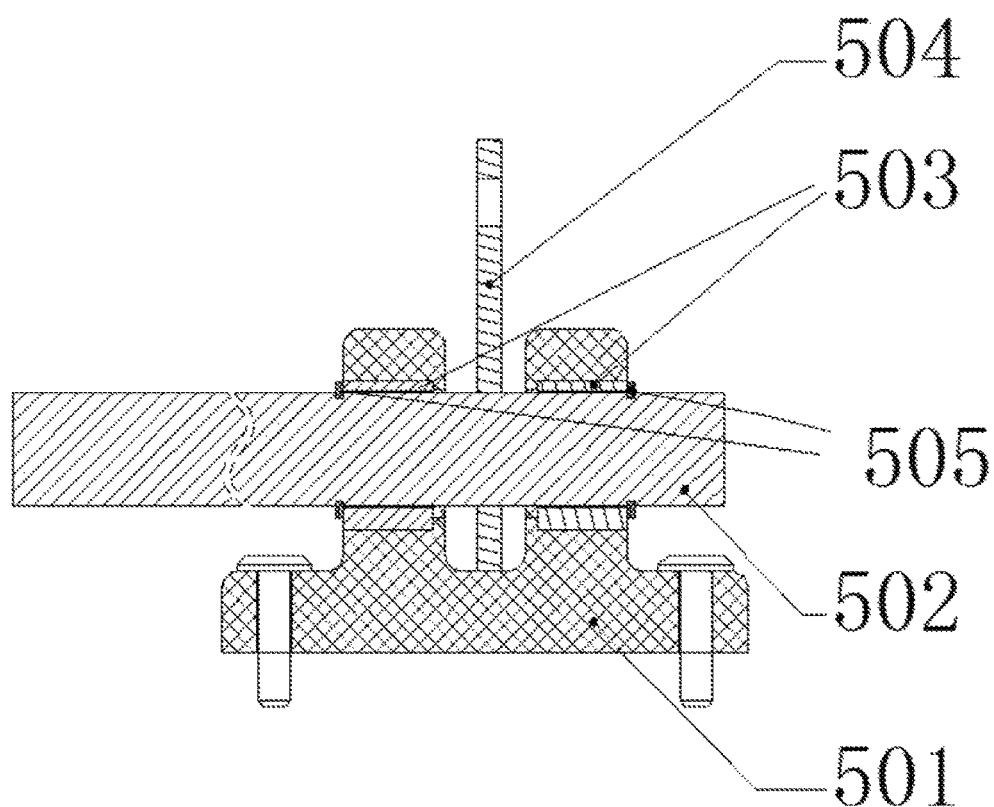
FIG. 11 is a cross-sectional view of B-B of a movable shade base provided by the disclosure.

As illustrated in FIGS. 9-11, the driver blade 504 is a part of the transmission component 5, the transmission component 5 also comprises a transmission shaft seat 501, a transmission shaft 502, a transmission shaft neck bush 503 and a second shaft circlip 505. The transmission shaft neck bush 503, the transmission shaft seat 501 and the driver blade 504 are inserted into the transmission shaft 502, and both ends of the transmission shaft 502 are stuck by the second shaft circlip 505, above components consist of at least one set of kits, and the first drive rod 4 and the second drive rod 6 are hinged by the other end of the driver blade 504.

As illustrated in FIG. 2, the transmission shaft 502 has a hexagonal cross section, the inner hole of the transmission shaft neck bush 503 is hexagonal, the inner hole of the driver blade 504 is hexagonal, and the transmission shaft neck bush 503 is connected with the transmission shaft seat 501 in a manner of gap junction, the transmission shaft 502 is connected with the transmission shaft neck bush 503 and the inner hole of driver blade 504 in a manner of interference fit.

Figure 3:
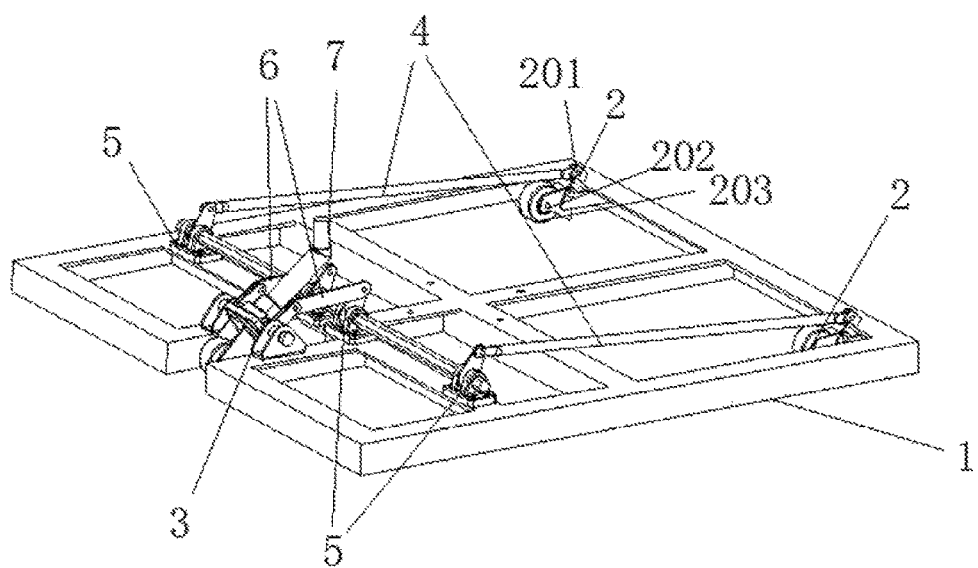
FIG. 3 is an axonometric view of a movable sunshade base assembly provided by the disclosure.
Figure 4:
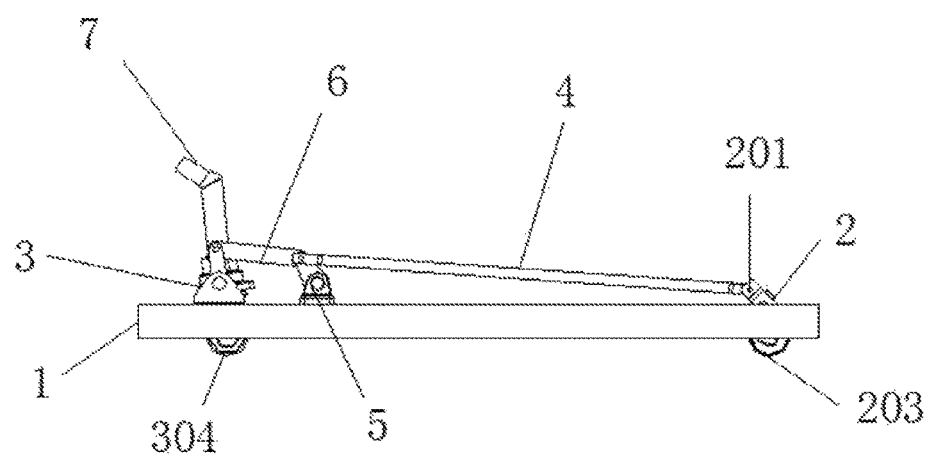
FIG. 4 is a schematic view of an open state of a movable sunshade base provided by the disclosure.
Figure 5:
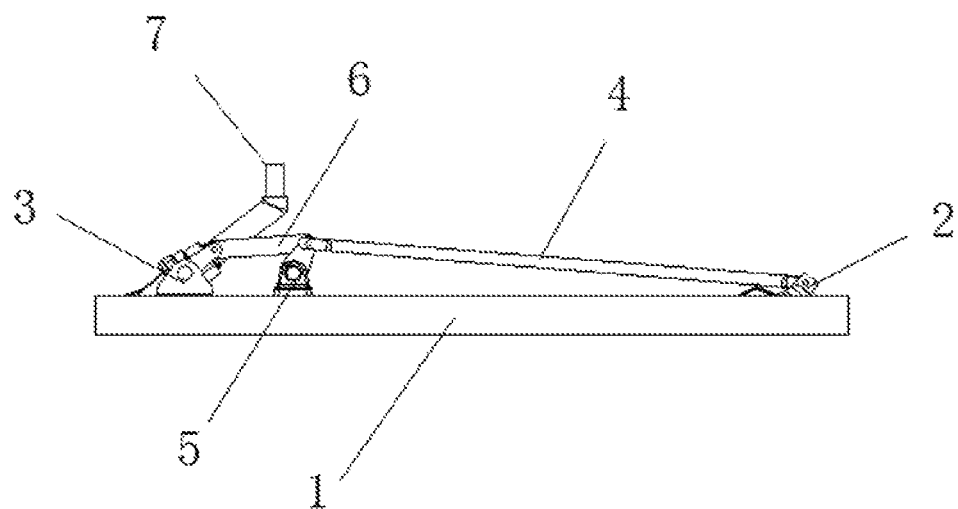
FIG. 5 is a schematic view of the combined state of a movable sunshade base provided by the disclosure.

As illustrated in FIGS. 2-5, in the above embodiment, the second drive rod 6 drives the transmission shaft 502 to rotate by swinging the pull rod 7, and the driver blade 504 rotates with the transmission shaft 502, and the first drive rod 4 is driven, and the first drive rod 4 realizes power transmission using leverage theorem. The roller bracket 201 controls the first roller 203 to move to the outside of the base frame. The guiding wheel frame 201 is eccentric inner wheel design, so when the guiding wheel frame 201 moves to the outside of the base, the pre-set angle of the guiding wheel frame 201 is centered on the weight of the base and the base frame 1, so that the base moves (as shown in FIG. 2 and FIG. 4). When the movement is completed, the pull rod 7 is swung in the opposite direction so that the second drive rod 6 drives the transmission shaft 502 to rotate and the driver blade 504 also rotates with the transmission shaft 502, thereby driving the first drive rod 4, the first drive rod 4 realizes power transmission using leverage theorem, the guiding wheel frame 201 utilizes power transmission using leverage theorem, and the roller bracket 201 controls the first roller 203 to move to the inside of the base frame, so that the base can support and firm the sunshade (as shown in FIG. 3 and FIG. 5). Therefore, the disclosure has the advantages of simple operation, convenient use, beautiful appearance, practicality and low cost, and can realize the smooth and convenient operation of the sunshade base movement, and can effectively solve the problem of moving the parasitic base in the real life, and the sunshade base described in the disclosure is suitable for promotion, and is applicable to all kinds of shapes of sunshade base.

In summary, the above is only a preferred embodiment of the disclosure. It is obvious that the realization of the disclosure is not limited to the above-described manner, and any modifications, equivalents, and improvements based on the inventive concept and technical aspects of the disclosure, or application of the inventive concept and technical scheme of the disclosure patent directly to other occasions shall be included within the scope of protection of the disclosure.

What is claimed is:

1. A movable sunshade base, wherein the movable sunshade base comprises a base frame, a base cover, a roller component, a rotary assembly, a transmission component, a first drive rod, a second drive rod and a pull rod;
   wherein the base cover is provided above the base frame; the roller component is arranged below the base frame and the rotary assembly is arranged mounted on the base frame; the transmission component is arranged on the base frame; the roller component is connected with the transmission component by the first drive rod; the rotary assembly is connected with the transmission component by the second drive rod, and the pull rod is provided at a top end of the rotary assembly; and
   the rotary assembly comprises a rotating seat, a guiding wheel frame, a second roller, ball bearings, a fixed bracket, a first shaft circlip and a positioning sleeve; the guiding wheel frame is connected with the rotating seat up and down by the ball bearings, and the second roller is arranged on an other end of the guiding wheel frame; and both ends of the rotating seat are mounted into holes of the fixed bracket.

2. The movable sunshade base of claim 1, wherein the roller component comprises a roller bracket and a first roller; the roller bracket is hinged to the base frame by a bolt; the first roller arranged at one end of the roller bracket is connected with the roller bracket through a hing pin, and the other end of the roller bracket is hinged to one end of the first drive rod.

3. The movable sunshade base of claim 1, wherein the guiding wheel frame is positioned on the rotating seat by the positioning sleeve, and a shaft of the guiding wheel frame is provided with a thread and is fixed to the rotating seat by a nut.

4. The movable sunshade base of claim 1, wherein the second roller is locked on the guiding wheel frame by a pinned outer screw and a pinned inner screw.

5. The movable sunshade base of claim 1, wherein a top end of the rotating seat is hinged to one end of the second drive rod, and a top end of the guiding wheel frame is connected with the pull rod.

6. The movable sunshade base of claim 1, wherein the transmission component comprises at least one set of transmission assembly consisting of a transmission shaft seat, a transmission shaft, a driver blade and a transmission shaft neck bush; the transmission shaft seat is locked on the base frame by bolted connection, the transmission shaft is arranged in a pre-set hole of the transmission shaft seat, the driver blade is provided between two circular holes of the transmission shaft seat through the transmission shaft neck bush, and the driver blade is mounted on the transmission shaft.

7. The movable sunshade base of claim 6, wherein the transmission shaft has a hexagonal cross section, and both ends of the transmission shaft are fastened to the transmission shaft seat by a second shaft circlip.

8. The movable sunshade base of claim 6, wherein an inner hole of the transmission shaft neck bush is hexagonal, and an inner hole of the driver blade is hexagonal; the transmission shaft neck bush is connected with the transmission shaft seat in a manner of gap junction, and the transmission shaft is connected with the transmission shaft neck bush and the inner hole of driver blade in a manner of interference fit.

9. The movable sunshade base of claim 6, wherein a top end of the driver blade is hinged to one end of the second drive rod or the first drive rod, respectively.

* * * * *